(12) United States Patent
Roh et al.

(10) Patent No.: US 12,172,234 B2
(45) Date of Patent: Dec. 24, 2024

(54) LASER WELDING METHOD AND MONITORING METHOD FOR SECONDARY BATTERY

(71) Applicant: SAMSUNG SDI CO., LTD., Yongin-si (KR)

(72) Inventors: Jae Hoon Roh, Yongin-si (KR); Sang Hyun Ryu, Yongin-si (KR); Myung Jun Park, Yongin-si (KR); Seong Bae An, Yongin-si (KR); Yong Gyu An, Yongin-si (KR); Hee Dong Jung, Yongin-si (KR); Jin Gyu Heo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 18/395,315

(22) Filed: Dec. 22, 2023

(65) Prior Publication Data

US 2024/0123548 A1 Apr. 18, 2024

Related U.S. Application Data

(62) Division of application No. 17/172,683, filed on Feb. 10, 2021, now Pat. No. 11,897,054.

(30) Foreign Application Priority Data

Feb. 17, 2020 (KR) .......................... 10-2020-0019130

(51) Int. Cl.
*B23K 26/26* (2014.01)
*H01M 50/536* (2021.01)
*B23K 101/36* (2006.01)

(52) U.S. Cl.
CPC ........... *B23K 26/26* (2013.01); *H01M 50/536* (2021.01); *B23K 2101/36* (2018.08)

(58) Field of Classification Search
CPC ............ B23K 2103/10; B23K 2103/12; B23K 26/32; B23K 2103/26; B23K 26/22;
(Continued)

(56) References Cited

U.S. PATENT DOCUMENTS 9,735,413 B2 5/2017 Nakai
9,947,913 B2 4/2018 Lee et al.
(Continued)

FOREIGN PATENT DOCUMENTS

CN 100590898 C 2/2010
CN 102132148 A 7/2011
(Continued)

OTHER PUBLICATIONS

Chinese Office action dated Sep. 16, 2022 issued in corresponding CN Application No. 202110180730.4, 9 pages.
(Continued)

*Primary Examiner* — Chris Q Liu
(74) *Attorney, Agent, or Firm* — Lewis Roca Rothgerber Christie LLP (57) ABSTRACT

Embodiments relate to laser welding methods, monitoring methods, and monitoring systems for a secondary battery. A laser welding method for a secondary battery includes performing laser welding on a positive electrode base having a thin-film shape in which a plurality of positive electrode base tabs are formed at a side, a negative electrode base having a thin-film shape in which a plurality of negative electrode base tabs are formed at a side, and a thin-film multi-tab to be joined to each of the positive electrode base and the negative electrode base, a welded portion in which the multi-tab is welded with the positive electrode base and the negative electrode base being melting-joined by using a laser such that a plurality of welding spots is formed on the welded portion.

10 Claims, 8 Drawing Sheets (58) Field of Classification Search
CPC .............. B23K 26/244; B23K 2101/38; B23K 2103/18; B23K 2103/50; B23K 20/10; B23K 2101/18; B23K 2103/05; B23K 2103/08; B23K 26/26; B23K 26/323; B23K 31/125; B23K 1/20; B23K 20/2275; B23K 20/233; B23K 20/24; B23K 2101/12; B23K 2101/32; B23K 2101/34; B23K 2101/36; B23K 2101/42; B23K 2103/172; B23K 2103/20; B23K 26/0006; B23K 26/032; B23K 26/0619; B23K 26/0622; B23K 26/0876; B23K 26/14; B23K 26/20; B23K 26/21; B23K 26/24; B23K 26/28; B23K 26/282; B23K 26/354; B23K 26/361; B23K 26/40; B23K 26/402; B23K 26/60; B23K 3/0661; B23K 35/025; B23K 35/262; B23K 35/3006; B23K 35/302; H01M 50/534; H01M 50/536; H01M 10/0525; H01M 2220/20; H01M 50/105; H01M 50/178; H01M 50/211; H01M 50/533; H01M 50/55; H01M 50/557; H01M 50/566; H01M 50/572; H01M 10/04; H01M 10/0404; H01M 10/0422; H01M 10/0436; H01M 10/42; H01M 10/425; H01M 10/4257; H01M 2220/30; H01M 4/661; H01M 4/667; H01M 4/70; H01M 4/74; H01M 4/75; H01M 50/10; H01M 50/103; H01M 50/50; H01M 50/507; H01M 50/509; H01M 50/516; H01M 50/522; H01M 50/528; H01M 50/531; H01M 50/552; H01M 50/553
USPC ......................... 219/121.63, 121.64, 121.83
See application file for complete search history.

(56) References Cited

U.S. PATENT DOCUMENTS

| | | |
|---|---|---|
| 10,903,471 B2 | 1/2021 | Onodera et al. |
| 2006/0263686 A1 | 11/2006 | Zhao |
| 2009/0035580 A1 | 2/2009 | Chino et al. |
| 2009/0314750 A1 | 12/2009 | Saitoh et al. |
| 2015/0001196 A1 | 1/2015 | Kim et al. |
| 2016/0072115 A1 | 3/2016 | Kim et al. |
| 2016/0211500 A1 | 7/2016 | Lee et al. |
| 2019/0198848 A1 | 6/2019 | Onodera et al. |
| 2020/0373544 A1 | 11/2020 | Park |

FOREIGN PATENT DOCUMENTS

| | | |
|---|---|---|
| CN | 104535587 A | 4/2015 |
| CN | 105139386 A | 12/2015 |
| CN | 105303579 A | 2/2016 |
| CN | 205008844 U | 2/2016 |
| CN | 105406102 A | 3/2016 |
| CN | 105555466 A | 5/2016 |
| CN | 107127432 A | 9/2017 |
| CN | 206632513 U | 11/2017 |
| CN | 108665453 A | 10/2018 |
| CN | 109490308 A | 3/2019 |
| JP | H 11-320144 A | 11/1999 |
| JP | 2002-316279 A | 10/2002 |
| JP | 2004-138400 A | 5/2004 |
| JP | 2008-272767 A | 11/2008 |
| JP | 2010-005632 A | 1/2010 |
| JP | 2010-046679 A | 3/2010 |
| KR | 10-2012-0096621 A | 8/2012 |
| KR | 10-2015-0003607 A | 1/2015 |
| KR | 10-2015-0045388 A | 4/2015 |
| KR | 10-2019-0082549 A | 7/2019 |
| WO | WO 2006/124223 A2 | 11/2006 |
| WO | WO 2018/055764 A | 3/2018 |

OTHER PUBLICATIONS

Chinese Office Action dated Oct. 30, 2023, issued in corresponding Chinese Patent Application No. 202110180730.4 (29 pages, including 16 pages of English translation).

Chinese Office action dated Aug. 9, 2023 issued in corresponding CN Application No. 202110180730.4, 11 pages.

Korean Office Action dated May 9, 2023, issued in corresponding Korean Patent Application No. 10-2020-0171705 (6 pages).

Extended European Search Report issued in Application No. 21156653.4 dated Jul. 22, 2021, 7 pages.

Perforated portion

| Positive electrode Vision Image | Inspection Image | Determination |
|---|---|---|
| | | OK |
| | | OK |
| | | OK |
| | | OK |
| | | NG |
| | | NG |
| | | NG |
| | | NG |

FIG. 10

LASER WELDING METHOD AND MONITORING METHOD FOR SECONDARY BATTERY

CROSS-REFERENCE TO RELATED APPLICATIONS

This application is a divisional of U.S. patent application Ser. No. 17/172,683, filed on Feb. 10, 2021, which claims priority to and the benefit of Korean Patent Application No. 10-2020-0019130, filed on Feb. 17, 2020 in the Korean Intellectual Property Office, the entire disclosures of both of which are incorporated herein by reference.

BACKGROUND

1. Field

Aspects of embodiments of the present invention relate to laser welding methods, monitoring methods, and monitoring systems for a secondary battery.

2. Description of the Related Art

A secondary battery includes an electrode assembly including a positive electrode, a negative electrode, and a separator disposed between the positive electrode and the negative electrode and a cell including an electrolyte impregnated to the electrode assembly.

In general, the electrode assembly of the secondary battery has a structure in which a negative electrode active material layer or a positive electrode active material layer is formed on a thin-film-type base, and a negative electrode base tab or a positive electrode base tab is formed on an uncoated portion in which an active material layer is not formed. Ultrasonic welding is used to bond a separate multi-tab to a base tab of the related art.

However, in case of the ultrasonic welding, only whether a welded portion exists may be determined by an appearance inspection, and a welding defect, such as a weak welding state (a state having a low bonding strength of a welded portion because welding is not properly performed), may not be determined. Also, since inspection for an ultrasonic welded portion does not have a total quality verification method except for the appearance inspection, reliability of the ultrasonic welding may not be secured.

The above-described information described in this "Description of the Related Art" is provided to improve understanding of the background of the embodiments, and, thus, may include information that is not part of the related art.

SUMMARY

According to aspects of embodiments of the present invention, laser welding methods, monitoring methods, and monitoring systems for a secondary battery are capable of monitoring quality of a welded portion when laser welding is performed on a thin-film base and a multi-tab. According to further aspects of embodiments of the present invention, laser welding methods, monitoring methods, and monitoring systems for a secondary battery are provided which are capable of performing a total inspection of a quality of a welded portion when laser welding is performed on a thin-film base and a multi-tab.

According to one or more embodiments, a laser welding method for a secondary battery includes performing laser welding on a positive electrode base having a thin-film shape in which a plurality of positive electrode base tabs are formed at a side, a negative electrode base having a thin-film shape in which a plurality of negative electrode base tabs are formed at a side, and a thin-film multi-tab to be joined to each of the positive electrode base and the negative electrode base, a welded portion in which the multi-tab is welded with the positive electrode base and the negative electrode base being melting-joined by using a laser such that a plurality of welding spots is formed on the welded portion.

A front bead protruding in an embossed shape from a front surface of the welded portion and a back bead protruding in an embossed shape from a rear surface of the welded portion may be formed in each of the welding spots.

The back bead may have a diameter less than that of the front bead.

The multi-tab joined to the positive electrode base and the negative electrode base may be made of a different material than that of at least one of the positive electrode base and the negative electrode base.

A welded portion of the negative electrode base may have a shear strength of 4 kgf or less, and a welded portion of the positive electrode base may have a shear strength of 2 kgf or less. Here, the shear strength may allow all of the welded portions to be fractured.

According to one or more embodiments, a laser welding monitoring system for a secondary battery includes: a laser welding device configured to perform laser welding on a positive electrode base having a thin-film shape in which a plurality of positive electrode base tabs are formed at a side, a negative electrode base having a thin-film shape in which a plurality of negative electrode base tabs are formed at a side, and a thin-film multi-tab joined to each of the positive electrode base and the negative electrode base, wherein a welded portion in which the multi-tab is welded with the positive electrode base and the negative electrode base is melting-joined by using a laser such that a plurality of welding spots is formed on the welded portion; a perforated defect inspection device comprising a backlight configured to irradiate the welded portion with light in a direction from a first surface toward a second surface opposite the first surface of the welded portion, image equipment arranged at an opposite side of the welded portion from the backlight to collect light transmitted through the welded portion and form a first inspection image, and a controller configured to determine whether a perforated defect of the welded portion exists by analyzing the first inspection image; and a back bead inspection device comprising a front light configured to irradiate the welded portion with light in a direction from the second surface toward the first surface of the welded portion, image equipment arranged at a same side of the welded portion as the front light to collect light reflected by the welded portion and form a second inspection image, and a controller configured to determine whether a back bead defect of the welded portion exists by analyzing the second inspection image.

The controller of the perforated defect inspection device may determine that the welded portion is a welding defect when existence of a through-hole is determined as light transmitted through the welded portion is detected.

The controller of the back bead inspection device may determine that the welded portion is a welding defect when existence of a through-hole is determined as light transmitted through the welded portion is detected.

BRIEF DESCRIPTION OF THE DRAWINGS

The accompanying drawings are included to provide a further understanding of the present disclosure, and are incorporated in and constitute a part of this specification. The drawings illustrate some example embodiments of the present disclosure and, together with the description, serve to explain principles of the present disclosure. In the drawings.

DETAILED DESCRIPTION

The present invention will be described more fully herein with reference to the accompanying drawings, in which some example embodiments of the invention are shown. The example embodiments may, however, be embodied in many different forms and should not be construed as being limited to the embodiments set forth herein; rather, these embodiments are provided so that this disclosure will be thorough and complete, and will fully convey the scope of the present disclosure to those skilled in the art.

Also, in the figures, a thickness or dimension of each of layers may be exaggerated for clarity of illustration. As used herein, the term "and/or" includes any and all combinations of one or more of the associated listed items. In this specification, it is to be understood that when a member A is referred to as being connected to a member B, the member A may be directly connected to the member B or indirectly connected to the member B with one or more members therebetween.

The terms used herein are for illustrative purposes of the present disclosure and should not be construed to limit the meaning or the scope of the present disclosure. As used in this specification, a singular form may, unless definitely indicating a particular case in terms of the context, include a plural form. Also, the expressions "comprise" and/or "comprising" used in this specification neither define the mentioned shapes, numbers, steps, operations, members, elements, and/or groups of these, nor exclude the presence or addition of one or more other different shapes, numbers, steps, operations, members, elements, and/or groups of these, or addition of these.

It is to be understood that, although the terms "first," "second," etc. may be used herein to describe various members, components, regions, layers, and/or sections, these members, components, regions, layers, and/or sections should not be limited by these terms. These terms are used to distinguish one member, component, region, layer, and/or section from another. Thus, a first member, a first component, a first region, a first layer, and/or a first section discussed below could be termed a second member, a second component, a second region, a second layer, and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "beneath" or "below" other elements or features would then be oriented "above" or "over" the other elements or features. Thus, the example term "beneath" can encompass both an orientation of "above" and "below."

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

Herein, laser welding and a monitoring method for a secondary battery according to some example embodiments will be described in further detail with reference to the accompanying drawings.

Figure 1:
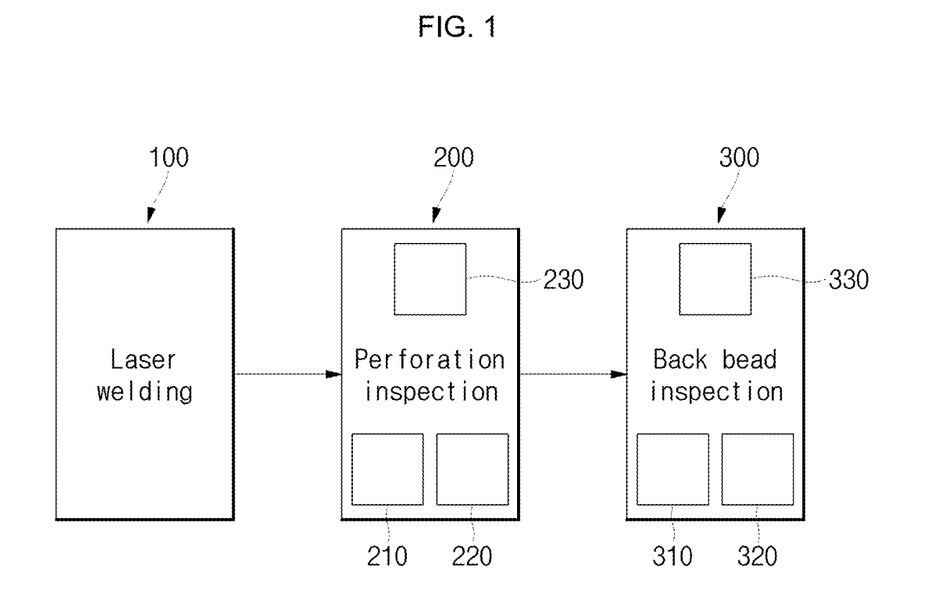
FIG. 1 is a schematic block diagram illustrating a system constitution for monitoring a laser welding quality according to an embodiment.

FIG. 1 is a schematic block diagram illustrating a system constitution for monitoring a laser welding quality according to an embodiment.

As illustrated in FIG. 1, a laser welding device 100 is used to bond a base tab and a multi-tab of an electrode assembly of a secondary battery. When laser welding is completed, whether a welded portion is defective is automatically determined while the welded portion sequentially passes through a perforated defect inspection device 200 and a back bead inspection device 300.

In an embodiment, the laser welding device 100 may be operated to spot-weld a welded portion by setting a pulse mode to minimize or reduce a heat-affected zone when a thin-film-type welded portion is joined.

The perforated defect inspection device 200 automatically inspects a defect in which a welded portion is perforated instead of being joined. The perforated defect inspection device 200 may inspect whether a defect exists by fixing an object to be inspected (herein, referred to as an inspection target object) to a jig and irradiating, with a backlight 210, at a rear side of the inspection target object. To this end, whether a defect of the laser welding exists is determined according to whether light passes by photographing whether light is transmitted to a front side of the inspection target object by using image equipment 220, such as a CCD camera. The determining of whether a defect exists may be automatically performed by a controller 230 in the perforated defect inspection device 200.

The back bead inspection device 300 may inspect whether the defect of the laser welding exists by irradiating, with a front light 310, at a front side of the inspection target object, photographing light reflected from a surface of the inspection target object by using image equipment 320, such as the CCD camera, and inspecting whether a back bead is formed by using a shading difference (to this end, the inspection target object is disposed such that the back bead faces the front light instead of the front bead). The determining of whether a defect exists may be automatically performed by a controller 330 in the back bead inspection device 300.

Herein, a welded portion of the secondary battery with the above-described perforated defect inspection and back bead inspection applied will be described in further detail.

Figure 2A:
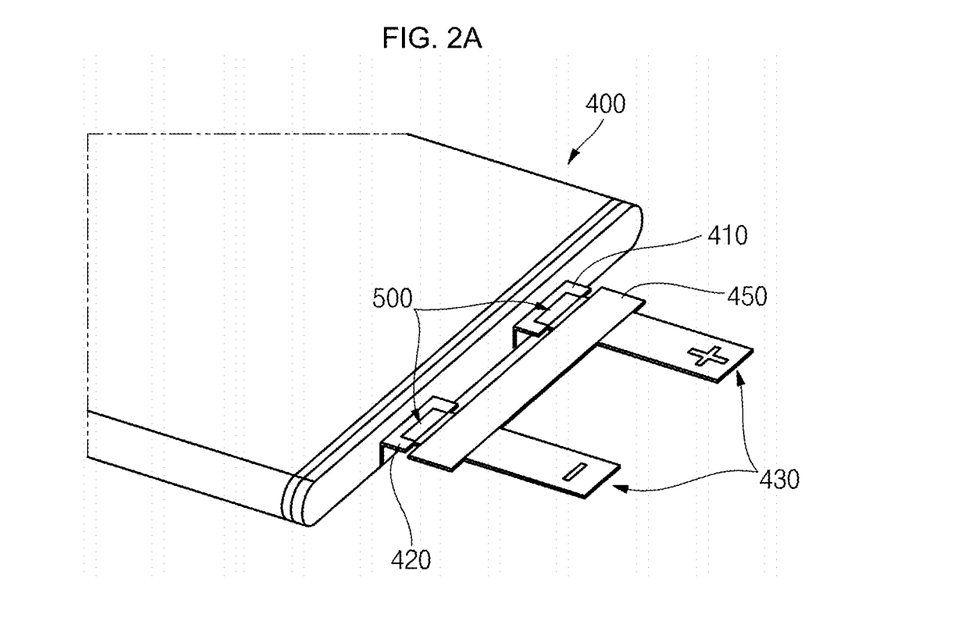
FIG. 2A is a partial perspective view illustrating a welded portion when laser welding is performed according to an embodiment.
Figure 2B:
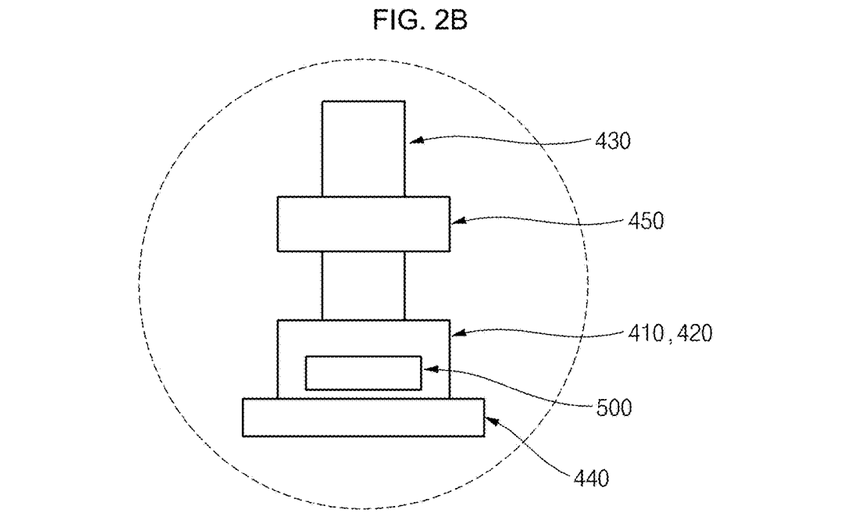
FIG. 2B is an enlarged plan view illustrating the welded portion of FIG. 2A.
Figure 3A:
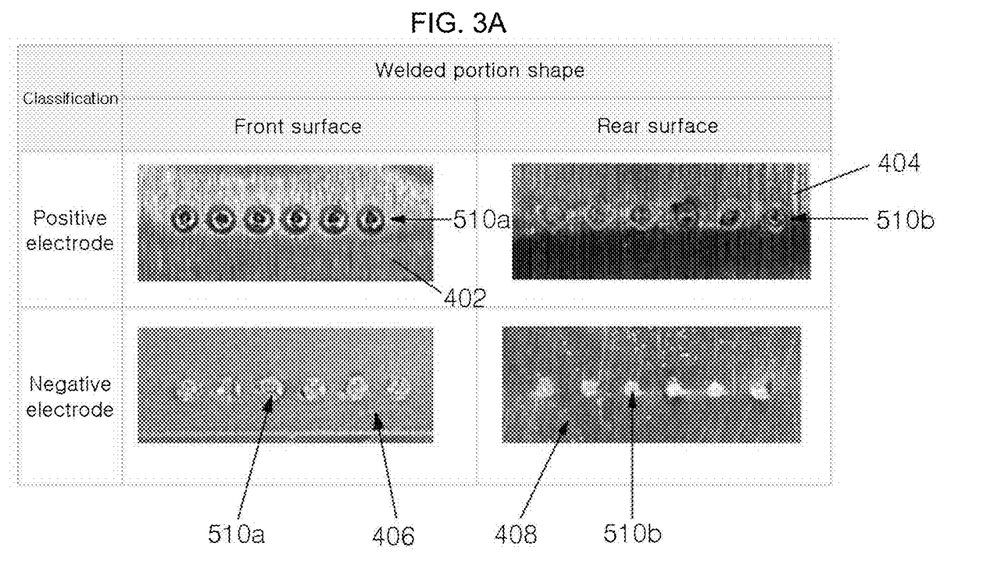
FIG. 3A shows photographs showing shapes of a front surface and a rear surface of a positive electrode welded portion and a negative electrode welded portion, on which the laser welding is applied, according to an embodiment.
Figure 3B:
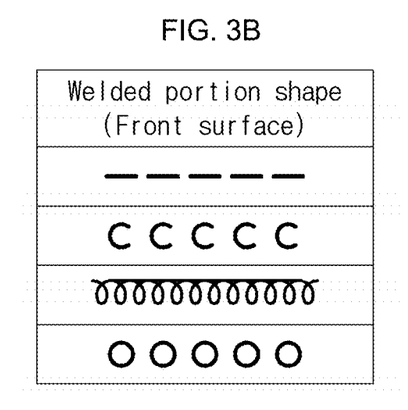
FIG. 3B is a schematic diagram showing a front shape of a positive electrode welded portion and a negative electrode welded portion, on which laser welding is applied, according to an embodiment.
Figure 3C:
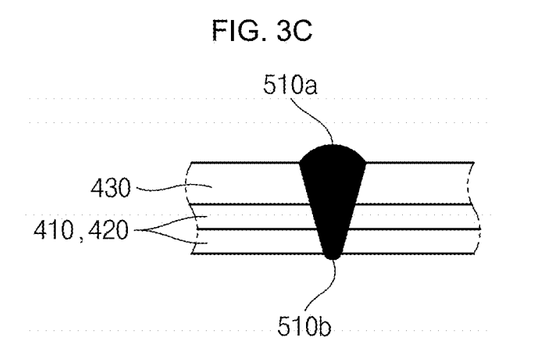
FIG. 3C is a schematic cross-sectional view illustrating a shape of the welded portion according to an embodiment.

FIG. 2A is a partial perspective view illustrating a welded portion when the laser welding is performed according to an embodiment; and FIG. 2B is an enlarged plan view illustrating the welded portion of FIG. 2A. FIG. 3A shows photographs showing shapes of a front surface and a rear surface of a positive electrode welded portion and a negative electrode welded portion, on which the laser welding is applied, according to an embodiment. FIG. 3B is a schematic diagram showing a front shape of a positive electrode welded portion and a negative electrode welded portion, on which laser welding is applied, according to an embodiment. FIG. 3C is a schematic cross-sectional view illustrating a shape of the welded portion according to an embodiment.

As illustrated in FIGS. 2A and 2B, in an embodiment, an electrode assembly 400 has a structure including a pair of positive electrode base tabs 410 disposed in a positive electrode base and a pair of negative electrode base tabs 420 disposed in a negative electrode base. Each of the positive electrode base and the negative electrode base may have a thin-film shape, and the base tab may also have a thin-film shape.

In an embodiment, each of the pair of positive electrode base tabs 410 and the pair of negative electrode base tabs 420 are combined into one body and then bent to a side, and a multi-tab 430 (or an electrode lead) is bonded to each of the bent positive electrode base tab 410 and the bent negative electrode base tab 420. The bonding method thereof may be the above-described laser welding method, and a welded portion 500 obtained by welding a portion of an area in which the base tab 410 and 420 and the multi-tab 430 overlap each other may be formed. In an embodiment, a protection tape 440 may be attached to a connection portion of a base with the positive electrode base tab 410 and the negative electrode base tab 420, and a tab tape 450 may be attached to the multi-tab 430 for insulation and protection.

In an embodiment, the laser welding may be performed concurrently (e.g., simultaneously) on the welded portion of the positive electrode base tab 410 and the negative electrode base tab 420 by the laser welding device 100 of FIG. 1. In an embodiment, the laser welding is performed in a pulse mode, and a welding bead is formed in a dot shape. That is, as illustrated in FIGS. 3A and 3B, a plurality of front beads 510a and a plurality of back beads 510b are formed on a front surface and a rear surface of the welded portion 500 of the positive electrode base tab 410 and the negative electrode base tab 420, respectively. Thus, when the back bead 510b is not properly formed, or a hole is formed in the welded portion 500 due to excessive melting, a welding defect may be determined.

While ultrasonic welding of the related art is a contacting and pressing-type welding method that is performed in a state of pressing the welded portion, the laser welding is a melting-type bonding method that is performed in a non-contact manner and allows a material of the welded portion to be melted. Thus, the laser welding has a welding strength greater than that of the ultrasonic welding.

In an embodiment, when a tensile force is measured with respect to a case that a force of pulling the welded portion of the positive electrode and the negative electrode, to which the laser welding according to an embodiment is applied, the welded portion at the negative electrode side may have a maximum shear strength of about 4 kgf, and the welded portion at the positive electrode side may have a maximum shear strength of about 2 kgf. This result shows that a tensile force of the negative electrode is greater by 1.5 kgf to 2 kgf and a tensile force of the positive electrode is greater by 1.0 kgf to 1.5 kgf than the ultrasonic welding.

Also, when standard deviations of the tensile forces of the welded portion of the positive electrode and the negative electrode, to which the laser welding according to an embodiment is applied, and the welded portion of the ultrasonic welding are compared, the standard deviation of the laser welding according to an embodiment is remarkably reduced to be less by about 20% than that of the ultrasonic welding. That is, it may be understood that the ultrasonic welding shows a wide quality distribution due to a great difference between the tensile forces of a welded portion on which the welding is properly performed and a welded portion on which the welding is not properly performed and does not secure reliability of the welded portion. However, it may be understood that when the laser welding according to an embodiment is applied, a quality distribution improves to be greater by 80% or more than that of the ultrasonic welding, and the reliability of the welded portion may be secured.

When the laser welding according to an embodiment is applied, as the welding is performed to form two points or more of welding spots (points at which the front bead and the back bead are formed) at one welded portion, shearing of the welded portion is not generated at all of a low height and a great height of the welded portion. That is, since the welded portion in which two points to seven points of welding spots are formed maintains a welded state without shearing or fracturing even by performing a drop test several tens of times under a general condition and a high strength condition, the welding reliability may be improved.

The above-described welding spot according to an embodiment is shown in FIGS. 3A and 3C.

As illustrated in FIGS. 3A and 3C, the front bead 510a formed on a front surface 402 of the welded portion at the positive electrode side has a circular shape on a plane, and protrudes to have a semi-circular/semi-elliptical shape on a side surface or a cross-section as in FIG. 3C. In comparison, the back bead 510b formed on a rear surface 404 of the welded portion at the positive electrode side may have a diameter that is slightly smaller than that of the front bead 510a and a protruding height that is also less than that of the front bead 510a.

The front bead 510a formed on a front surface 406 of the welded portion at the negative electrode side may have a diameter that is equal to or less than that of the front bead 510*a* at the positive electrode side and a protruding height that is also equal to or less than that of the front bead 510*a* at the positive electrode side. This is because materials of the positive electrode base tab, the negative electrode base tab, and the multi-tab have different reflectance and absorptance with respect to a laser beam. Also, the back bead 510*b* formed on a rear surface 408 of the welded portion at the negative electrode side may have a diameter and a protruding height less than those of the front bead 510*a* formed on the front surface 406 of the welded portion at the negative electrode side.

In an embodiment, for example, the front bead 510*a* of the welded portion at the positive electrode side and the negative electrode side may protrude in an embossed shape having a diameter of about 0.3 mm to about 0.4 mm, and a distance between central points of the welding spots may be about 0.6 mm. In an embodiment, the back bead 510*b* of the welded portion at the positive electrode side and the negative electrode side may have a diameter that is about 30% to about 70% of the diameter of the front bead 510*a*. However, the above-described numerical values may be changed through setting variation of the laser welding device.

Hereinabove, an embodiment in which each of the front bead and the back bead at the positive electrode side and the negative electrode side has a circular shape is described. However, embodiments are not limited to the circular shape of each of the front bead and the back bead. For example, as illustrated in FIG. 3B, the front bead may have a shape of a plurality of straight lines or a continuous spiral shape. Also, the front bead may have a shape of a symbol or a specific character such as 'C' or 'O'. That is, the shape of the front bead may be variously changed. The shape of the back bead may also be variously changed according to the shape of the front bead.

In an embodiment, in the positive electrode, all of the positive electrode base tab 410 and the multi-tab 430 are mainly made of aluminum that is a material having a high reflectance (e.g., a reflectance of 90%). In an embodiment, in the negative electrode, the negative electrode base tab 420 is mainly made of copper that is a material having a high reflectance (e.g., a reflectance of 93%), and the multi-tab 430 is mainly made of nickel that is a material having a low reflectance (e.g., a reflectance of 72%). Thus, in an embodiment, in the positive electrode, welding is performed between the same kind of materials having the same melting point (e.g., about 660.2° C.), and, in the negative electrode, welding is performed between different kinds of materials having different melting points (e.g., about 1083±1° C. for copper and about 1455±1° C. for nickel). Therefore, the negative electrode has a disadvantage in welding condition in comparison with the positive electrode. Thus, a wavelength of the laser is set in consideration of a melting point, a reflectance, and a laser absorptance of the tab material.

For example, in an embodiment, in the negative electrode, as the nickel multi-tab 430 is disposed at an upper portion, and the copper base tab 420 is disposed at a lower portion, the welding may be performed based on a melting point of nickel because the nickel is disposed at the upper portion although the copper has a low melting point. Also, in the positive electrode, since the welding is performed between the same kind of materials and between materials having the high reflectance, a welding time may be equal to that in case of the negative electrode, but a laser output for the welding of the positive electrode may be greater than that for the welding of the negative electrode. In consideration of the above-described features, in an embodiment, the welding may be performed by setting a laser wavelength of 1070 nm that is an infrared region, and the laser output for welding of the positive electrode may be set to be greater by 2% than that for welding of the negative electrode based on a laser output of 300 W.

Also, in an embodiment, as spot welding is performed by using a pulse mode when irradiated with the laser, a heat-affected zone generated due to heat accumulation during welding may be minimized or reduced.

However, a welding defect may be generated despite the above-described effort, and an embodiment discloses a method for automatically inspecting whether the welding defect is generated to resolve inconvenience of the related art that inspects by using only the naked eyes of a worker.

Herein, a method for determining whether a welding defect of the welded portion is generated will be described in further detail.

Figure 4:
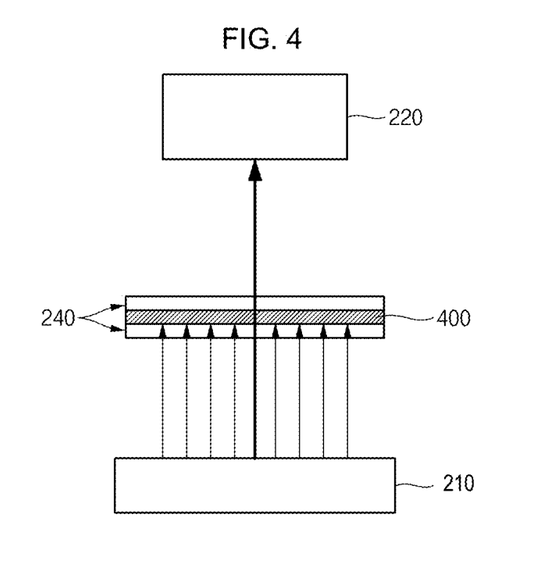
FIG. 4 is a schematic view illustrating a perforation inspection method according to an embodiment.
Figure 5A:
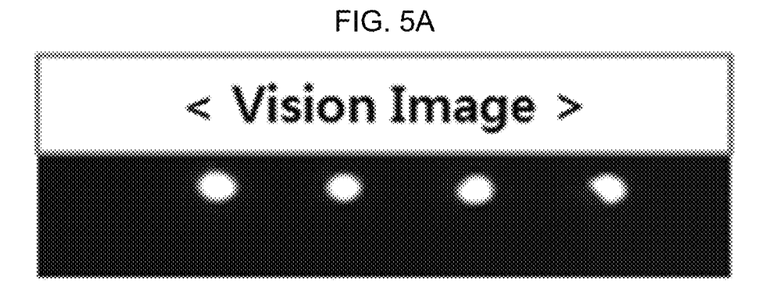
FIG. 5A is a vision image illustrating a defective welded portion in a perforation inspection of FIG. 4.
Figure 5B:
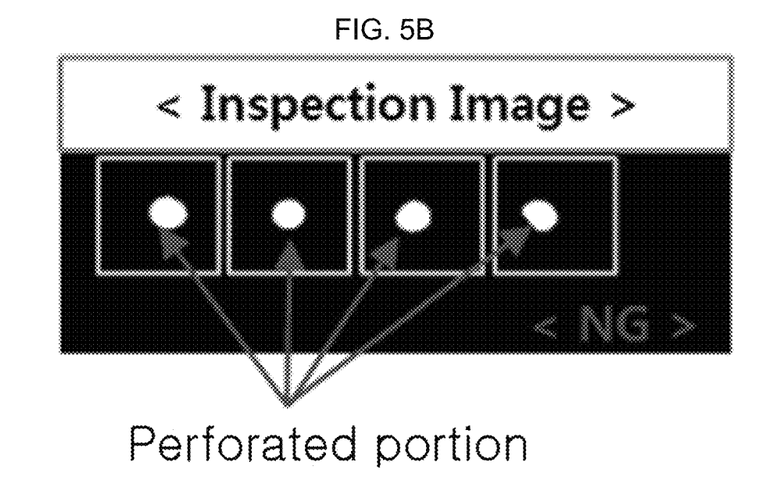
FIG. 5B is an inspection image illustrating a defective welded portion in the perforation inspection of FIG. 4.
Figure 6:
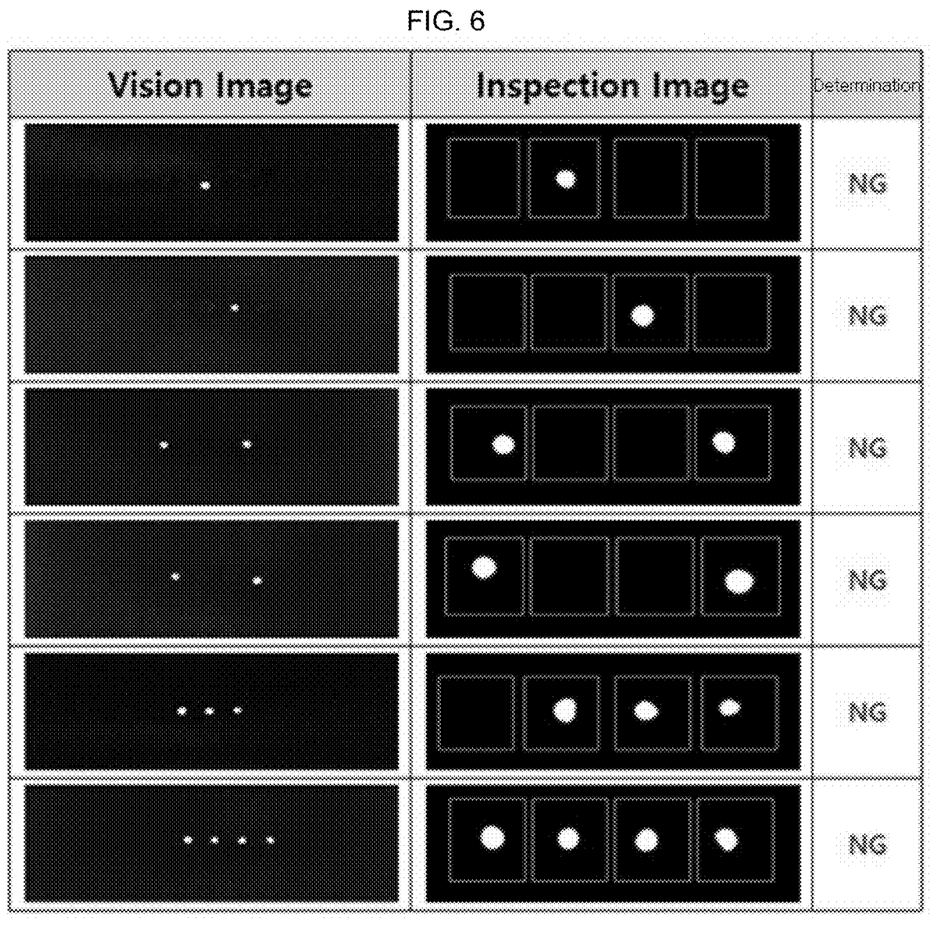
FIG. 6 is a view illustrating examples of defect determination in the perforation inspection of FIG. 4.

FIG. 4 is a schematic view illustrating a perforation inspection method according to an embodiment. FIG. 5A is a vision image illustrating a defective welded portion in the perforation inspection of FIG. 4. FIG. 5B is an inspection image illustrating a defective welded portion in the perforation inspection of FIG. 4. FIG. 6 is a view illustrating examples of defect determination in the perforation inspection of FIG. 4.

As illustrated in FIG. 4, a pair of jigs 240 is mounted to the electrode assembly 400, and the welded portion is irradiated with the backlight 210 disposed at a rear surface of the welded portion. Thereafter, whether light is transmitted through the welded portion is inspected by using the image equipment 220 disposed in a front direction of the electrode assembly 400. When the welded portion of the electrode assembly 400 is perforated due to over-welding, the light irradiated from the backlight 210 may be leaked to the front surface, and the image equipment 220 may detect the leaked light.

FIG. 5A is an image (a vision image) obtained by light transmitted through a through-hole when viewed by the naked eyes, and FIG. 5B is an inspection image photographed by the image equipment 220. Since the image viewed by the naked eyes and the inspection image photographed by the image equipment 220 show the same shape as each other, whether the perforated defect exists may be determined by the image photographed by the image equipment 220.

As illustrated in FIG. 6, since the vision image and the inspection image are the same as each other although all of the numbers and positions of perforations are different, the defect determination is possible. Since the welded portion is not perforated when the back bead having a normal shape is formed on the welded portion, all of through-holes are determined as defects regardless of the numbers and positions thereof.

When the perforation inspection is completely performed on the electrode assembly 400, the electrode assembly 400 moves, and a back bead inspection is performed.

Figure 7:
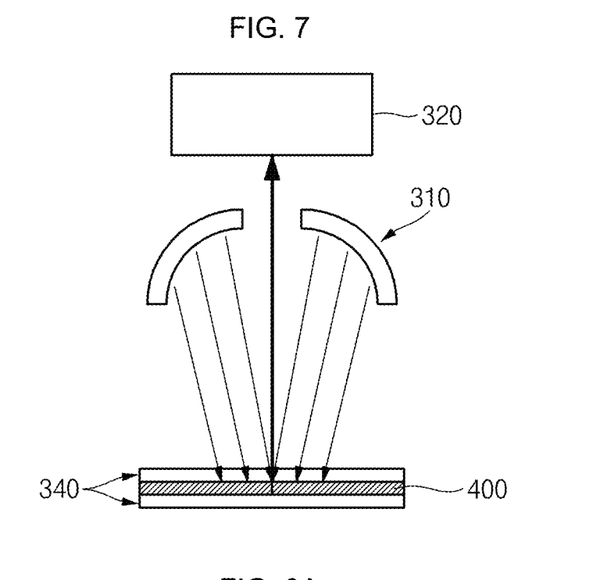
FIG. 7 is a schematic view illustrating a back bead inspection method according to an embodiment.
Figure 8A:
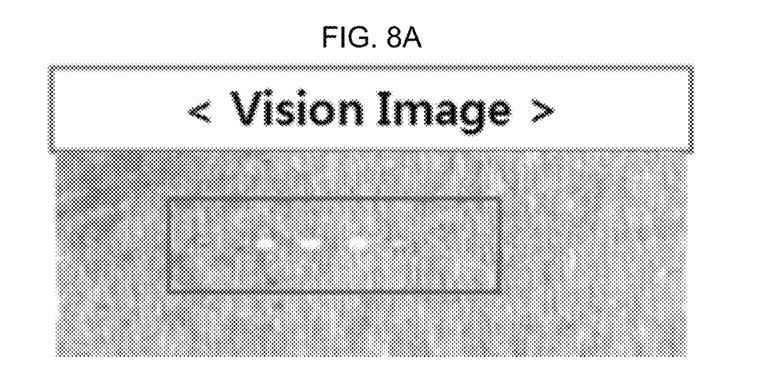
FIG. 8A is a vision image illustrating a defective welded portion in a back bead inspection of FIG. 7.
Figure 8B:
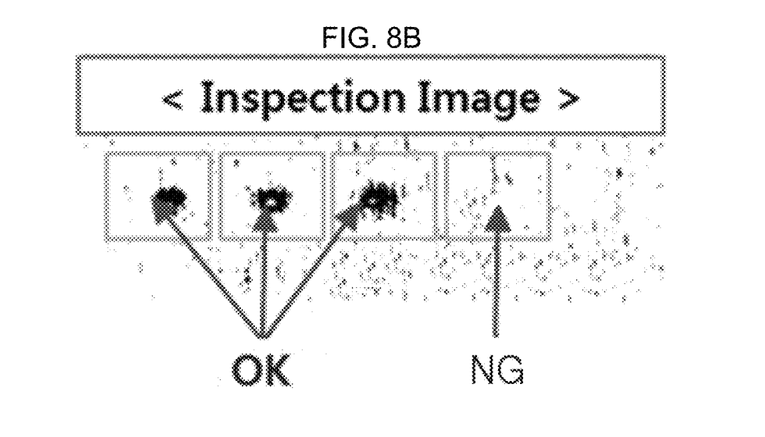
FIG. 8B is an inspection image illustrating a defective welded portion in the back bead inspection of FIG. 7.
Figure 9:
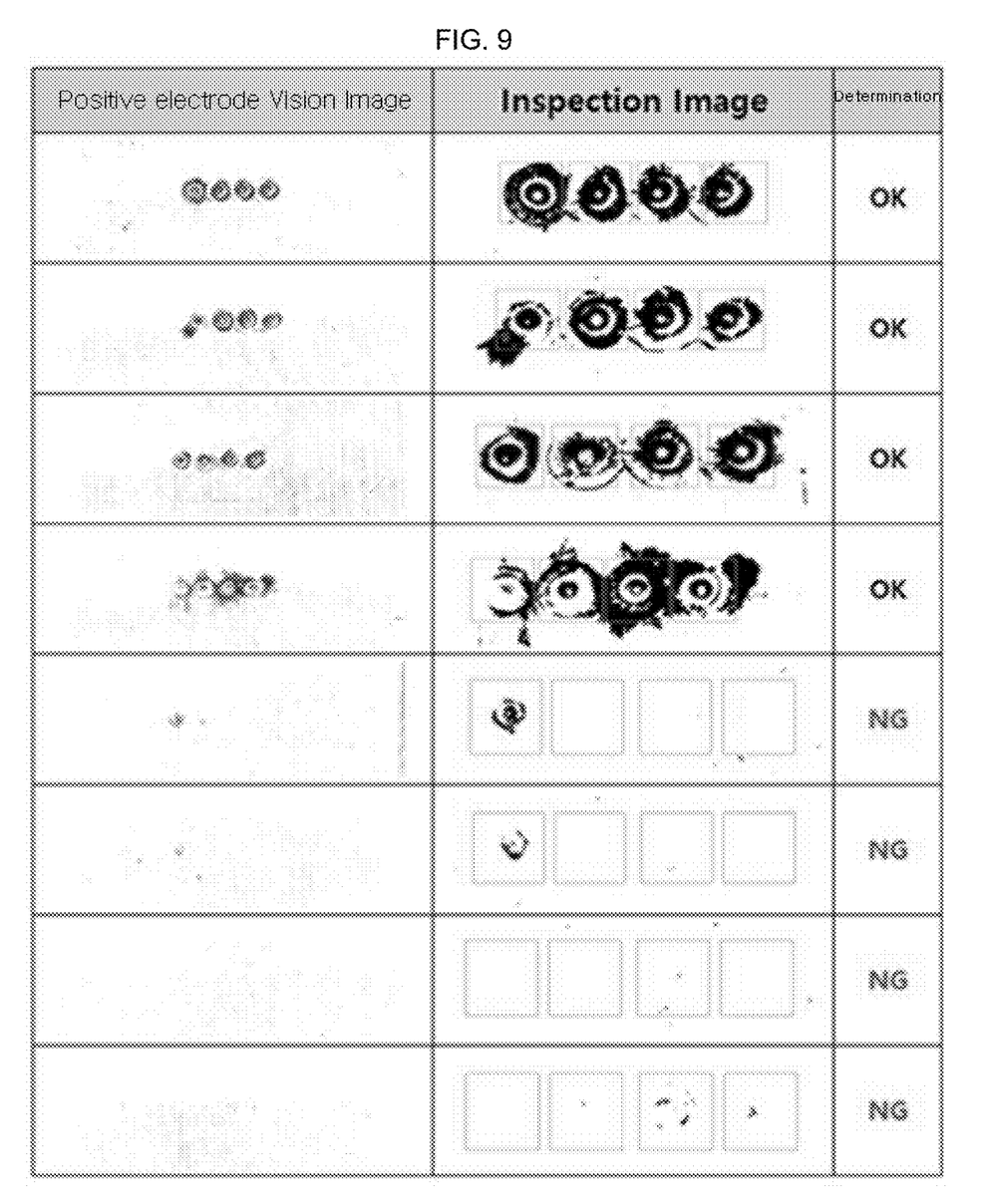
FIG. 9 is a view illustrating examples of defect determination of a positive electrode in the back bead inspection of FIG. 7.
Figure 10:
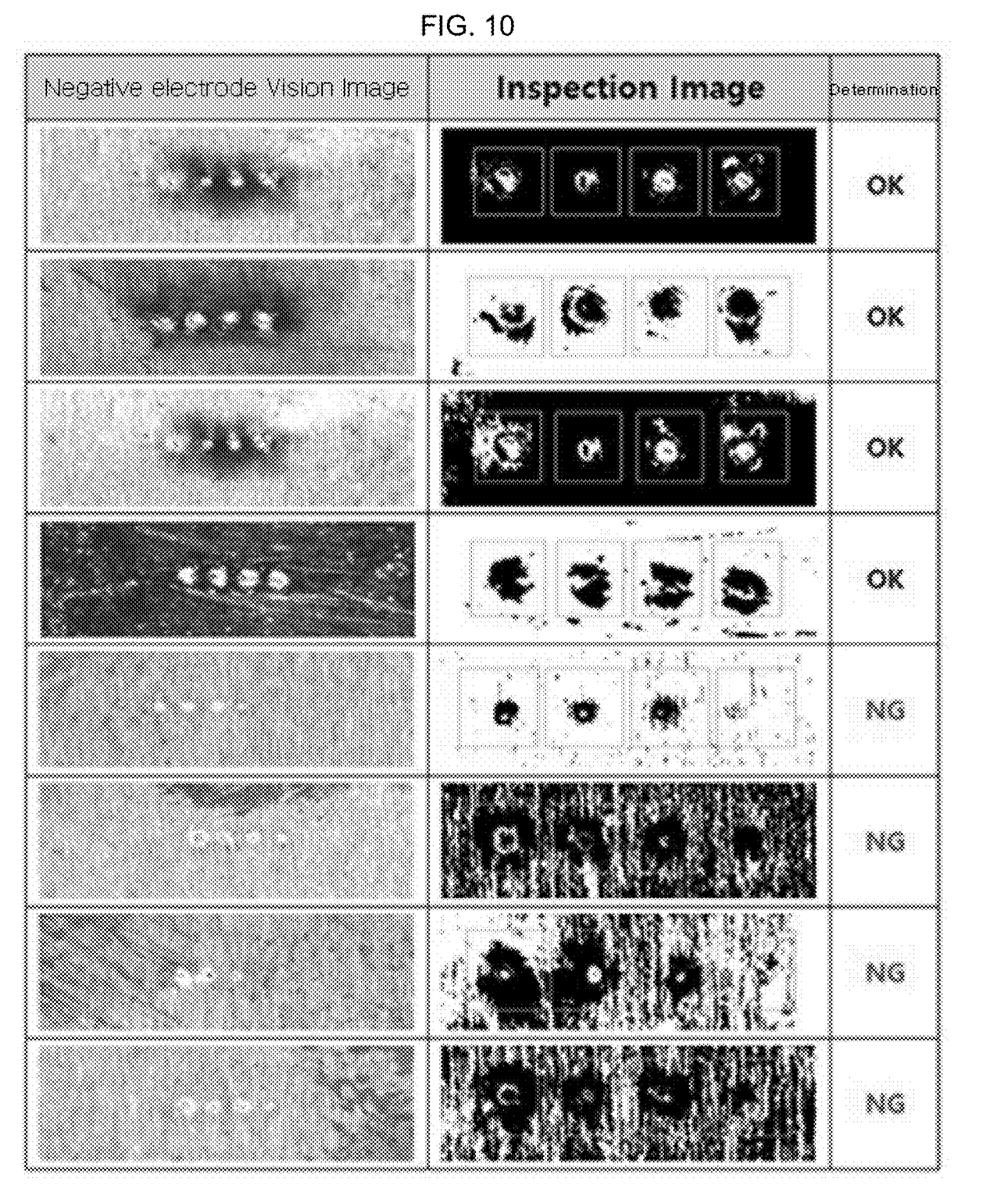
FIG. 10 is a view illustrating examples of defect determination of a negative electrode in the back bead inspection of FIG. 9.

FIG. 7 is a schematic view simply illustrating the back bead inspection method according to an embodiment. FIG. 8A is a vision image illustrating a defective welded portion in the back bead inspection of FIG. 7. FIG. 8B is an inspection image illustrating a defective welded portion in the back bead inspection of FIG. 7. FIG. 9 is a view illustrating examples of defect determination of the positive electrode in the back bead inspection of FIG. 7. FIG. 10 is a view illustrating examples of defect determination of the negative electrode in the perforation inspection of FIG. 9.

As illustrated in FIG. 7, the electrode assembly 400 is mounted to a pair of jigs 340 (or the jigs 240 used in the previous process), and the welded portion is irradiated with the front light 310 disposed in front of the welded portion. Thereafter, as reflected light is collected by the image equipment 320 disposed in a front direction of the electrode assembly 400, an image is acquired. Whether a defect of the welded portion exists is determined by generating an inspection image based on shading difference in the acquired image and then sensing whether the shape of the back bead exists. Whether the number and position of the back bead are defective may be determined in comparison with a setting image that is preset in the controller 330.

FIG. 8A is an image (a vision image) of the welded portion on which the back bead is formed when viewed by the naked eyes, and FIG. 8B is an inspection image photographed by the image equipment 320. Since the image viewed by the naked eyes and the inspection image photographed by the image equipment 320 show the same shape as each other, whether the back bead defect exists may be determined by the image photographed by the image equipment 320. Also, since only three back beads out of four back beads are formed, a finial defect determination is determined as a defect (NG) (refer to determination on a shape of fifth back bead in FIG. 10).

As illustrated in FIGS. 9 and 10, since the vision image and the inspection image are the same as each other although all of the numbers and positions of perforations are different, the defect determination is possible. Since the number and shape of the back bead are acquired as same as the setting image when the back bead having the normal shape is formed on the welded portion, when the preset number of back beads are not detected, all of the welded portions are determined as defects.

As illustrated in FIGS. 9 and 10, although the shape of the back bead of the welded portion at the positive electrode base tab side and the shape of the back bead of the welded portion at the negative electrode base tab side are slightly different, the number and the position may be checked on the vision image. Thus, when the number of the back bead in the inspection image is the same as the preset number although shapes and sizes are different, the controller 330 determines that the welding is properly performed (refer to determination OK in FIGS. 9 and 10). When the number of the back bead detected from the inspection image is different from the preset number, the controller 330 determines that the welding is defective (refer to determination NG in FIGS. 9 and 10).

As described above, according to an embodiment, whether the welded portion 500 of the electrode assembly 400 is defective may be automatically determined through the perforated defect inspection device 200 and the back bead inspection device 300 instead of being determined by the naked eyes of the worker.

Thus, a welding defect such as the perforation in the welded portion and the weak welding, such as the back bead that is not properly formed, may be inspected, the working time may be reduced, and the working efficiency may be improved.

According to an embodiment, whether the perforated defect exists may be automatically inspected by irradiating the rear surface of the object to be welded with the local lighting and detecting the light transmitted through a perforated portion.

Also, according to an embodiment, since the light reflected from the welding back bead may be detected by irradiating the front surface of the object to be welded with the light, and the welding shape image may be automatically generated by the shading difference, a welding defect and weak welding of the welded portion may be inspected.

The above-described embodiments are provided as example embodiments, and, thus, the present invention is not limited to the foregoing embodiments, and also it will be understood by those of ordinary skill in the art that various changes in form and details may be made therein without departing from the spirit and scope of the present invention as set forth in the following claims.

What is claimed is:

1. A laser welding monitoring system for a secondary battery, the system comprising:
    a laser welding device configured to perform laser welding on a positive electrode base having a thin-film shape in which a plurality of positive electrode base tabs are formed at a side, a negative electrode base having a thin-film shape in which a plurality of negative electrode base tabs are formed at a side, and a thin-film multi-tab to be joined to each of the positive electrode base and the negative electrode base, wherein a welded portion in which the multi-tab is welded with the positive electrode base and the negative electrode base is melting-joined by using a laser such that a plurality of welding spots is formed on the welded portion;
    a perforated defect inspection device comprising a backlight configured to irradiate the welded portion with light in a direction from a first surface toward a second surface opposite the first surface of the welded portion, image equipment arranged at an opposite side of the welded portion from the backlight to collect light transmitted through the welded portion and form a first inspection image, and a controller configured to determine whether a perforated defect of the welded portion exists by analyzing the first inspection image; and
    a back bead inspection device comprising a front light configured to irradiate the welded portion with light in a direction from the second surface toward the first surface of the welded portion, image equipment arranged at a same side of the welded portion as the front light to collect light reflected by the welded portion and form a second inspection image, and a controller configured to determine whether a back bead defect of the welded portion exists by analyzing the second inspection image.

2. The laser welding monitoring system of claim 1, wherein the controller of the perforated defect inspection device determines that the welded portion is a welding defect when existence of a through-hole is determined as light transmitted through the welded portion is detected.

3. The laser welding monitoring system of claim 1, wherein the controller of the back bead inspection device determines that the welded portion is a welding defect when existence of a through-hole is determined as light transmitted through the welded portion is detected.

4. The laser welding monitoring system of claim 1, wherein a front bead protruding in an embossed shape from a front surface of a welded portion of the welded portions and a back bead protruding in an embossed shape from a rear surface of the welded portion are formed in each of the welding spots.

5. The laser welding monitoring system of claim 4, wherein the back bead has a diameter less than that of the front bead.

6. The laser welding monitoring system of claim 1, wherein the multi-tab joined to the positive electrode base and the negative electrode base is made of a different material than that of at least one of the positive electrode base and the negative electrode base.

7. The laser welding monitoring system of claim 6, wherein the welded portion of the negative electrode base has a shear strength of 4 kgf or less, and the welded portion of the positive electrode base has a shear strength of 2 kgf or less, and wherein the shear strength allows all of the welded portions to be fractured.

8. The laser welding monitoring system of claim 1, wherein a maximum shear strength of the welded portion of the negative electrode base is greater than a maximum shear strength of the welded portion of the positive electrode base.

9. The laser welding monitoring system of claim 1, wherein the laser welding is performed using a laser output of 300 W.

10. The laser welding monitoring system of claim 1, wherein the laser welding is performed in a pulse mode.

\* \* \* \* \*